United States Patent [19]

Himmelmann et al.

[11] 3,762,926

[45] Oct. 2, 1973

[54] GELATINO SILVER HALIDE EMULSION CONTAINING A TRIMESIC ALDEHYDE HARDENING AGENT

[75] Inventors: Wolfgang Himmelmann, Opladen; Ernst Roos, Cologne; Johannes Sobel, Leverkusen, all of Germany

[73] Assignee: AGFA-Gevaert Aktiengesellschaft, Leverkusen, Germany

[22] Filed: Jan. 5, 1971

[21] Appl. No.: 104,132

[30] Foreign Application Priority Data
Jan. 17, 1970   Germany................... P 20 02 063.7

[52] U.S. Cl.................... 96/111, 260/117, 260/599, 260/600
[51] Int. Cl............................................. G03c 1/30
[58] Field of Search............... 96/50 PT, 111, 114.7; 260/117

[56] References Cited
UNITED STATES PATENTS

| | | | |
|---|---|---|---|
| 3,451,817 | 6/1969 | Bard et al. | 96/111 X |
| 3,565,632 | 2/1971 | Mills et al. | 96/111 |
| 3,677,760 | 7/1972 | Iwano et al. | 96/111 X |

*Primary Examiner*—Norman G. Torchin
*Assistant Examiner*—Won H. Louie, Jr.
*Attorney*—Connolly & Hutz

[57] ABSTRACT

Trimesic aldehydes, which are substituted in the 2-,4- and 6-position with chlorine, hydroxy or methoxy, as well as hexamethyl acetals and bisulfite addition products of such aldehydes are useful for hardening gelatin layers especially photographic gelatin layers. The hardening effect is developed by rendering alkaline the gelatin that contains any of these aldehydes.

3 Claims, No Drawings

GELATINO SILVER HALIDE EMULSION CONTAINING A TRIMESIC ALDEHYDE HARDENING AGENT

The invention relates to a process for the hardening of layers which contain gelatin.

Numerous crosslinking agents or hardeners for gelatin have already been described, e.g., metal salts such as chromium, aluminium or zirconium salts, aldehydes or their derivatives, especially formaldehyde, dialdehydes, mucochloric acid, diketones, quinones and chlorides and anhydrides of dibasic organic acids, dianhydrides and compounds which contain several reactive vinyl groups such as vinyl sulfones and acrylamides are known as hardeners for gelatin. Compounds which contain at least two heterocyclic three-membered rings which can be easily cleaved, such as ethylene oxide or ethylene imine rings, may also be used as hardeners for gelatin. Polyfunctional methane sulphonic acid esters and bis-α-chloroacrylamido compounds as well as derivatives of cyanuric chloride and dichloroquinoxaline derivatives have also been described as hardeners for gelatine.

Recently, high molecular weight compounds have also been recommended for use as gelatin hardeners, e.g., homopolymers and copolymers of acrolein or derivatives thereof and alginic acid derivatives. These high molecular weight compounds are used particularly as diffusion fast hardeners whose action is confined to their particular layer.

Resorcinol aldehyde is known as accelerator for hardeners which contain aldehyde groups. In recent times water-soluble aromatic dialdehydes have been described as hardeners to be used in aqueous baths.

Many of the compounds mentioned above, however, cannot be used for photographic purposes. Some are photographically active, others influence the physical properties, e.g., the fragility of the gelatin layers, so adversely that they cannot be used. Others again tend to undergo decomposition or to change the pH-value during the hardening reaction. In some cases, crosslinking agents for gelatin have also been found to have a damaging effect on the skin, as in the case of compounds which contain ethylene imine or ethylene oxide groups, so that their use is unsuitable on physiological grounds. Lastly, in a hardener for photographic layers which contain gelatin, it is of great importance, both for reasons of manufacture and for processing, that the beginning of the crosslinking reaction should be controllable within certain limits, for example by the choice of drying temperature or of the pH-value.

It is the object of the invention to provide hardeners for gelatin layers, in particular for photographic gelatin layers, which cause latent hardening. "Latent" hardening is understood to mean a crosslinking reaction which sets in only under certain external conditions, e.g., under the action of alkali or heat, and in which the hardening then rapidly reaches its maximum value. Compounds which have a predominantly latent effect are of great practical importance because the photographic properties, such as the maximum obtainable density, gradation and sensitivity to light, which generally undergo changes with increasing crosslinking of the layers, should be kept as constant as possible during storage and before processing. Hardening with a 100 percent latent effect naturally does not exist since a small proportion of any hardener is always effective during storage. In some cases, a substance which prevents the hardening may be added in small quantities to the latent hardener to suppress premature hardening. For example, dimethylcyclohexane-1,3-dione may be added as such a hardening inhibitor when using glutaric dialdehyde bisulfite as latent hardener.

In has now been found that aromatic trialdehydes and their derivatives, especially trimesic aldehydes which are substituted with chlorine, hydroxy or methoxy in the 2-, 4- and 6-position as well as their hexamethyl acetals and bisulfite addition products are suitable hardeners with a predominantly latent effect for photographic layers which contain gelatin.

The invention therefore relates to a process for the hardening of layers which contain gelatin by the addition of hardeners to the casting solutions for the layers, followed by drying of the layers, which is characterized in that (1) the hardeners used are trimesic aldehydes substituted with chlorine, hydroxy or methoxy in the 2-, 4- and 6-position, or their hexamethyl acetals or bisulphite addition products, and (2) the layers are treated with an alkaline bath at any time after drying.

The latent hardeners according to the invention may be represented by the following general formula:

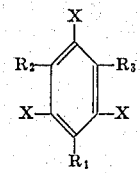

in which
X represents one of the radicals

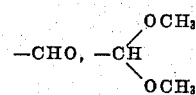

and

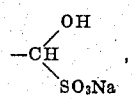

and
$R_1$, $R_2$ and $R_3$ each represents one of the radicals —OH, —OCH$_3$ and —Cl.

The following are examples of compounds which have been found suitable hardeners:

1

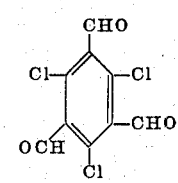

2

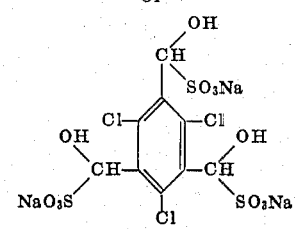

3

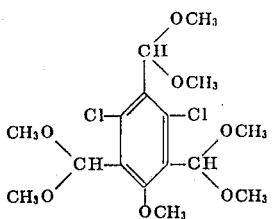

4

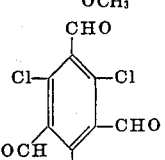

5

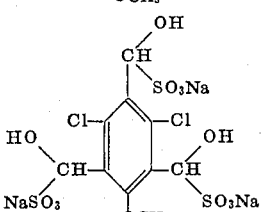

6

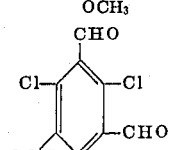

7

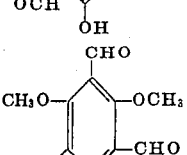

8

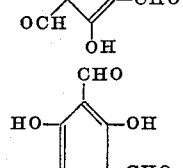

9

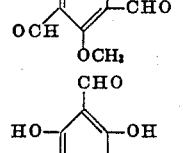

The preparation of the aromatic trialdehydes according to the invention and their derivatives is described in detail in the following examples.

2,4,6-Trichloro-trimesic aldehyde (1)

430.5 g (1 mol) of 1,3,5-tris-(dichloromethyl)-2,4,6-trichlorobenzene and 1,000 ml of concentrated sulfuric acid are stirred for 7 hours at 90° to 120°C giving rise to copious evolution of HCl. The resulting solution is poured onto 3 kg of ground ice with stirring and the precipitated product is isolated by suction filtration, washed with water and recrystallized from benzene. Yield: 209 g = 79 percent of the theory, colorless crystals, m.p.: 183° to 185°C.

2-Methoxy-4,6-dichloro-trimesic aldehyde hexamethyl acetal (3)

216 g (0.5 mol) of 1,3,5-tris-(dichloromethyl)-2,4,6-trichlorobenzene are introduced into a solution of 140 g (3.5 mol) of sodium hydroxide in 1,000 ml of methanol at 20° to 50°C with cooling. When the exothermic reaction has died down, the mixture is boiled for 3 hours and 1,000 ml of water are added. The precipitated crystals are isolated by suction filtration and recrystallized from light benzine.
Yield: 146 g = 73 percent of the theory of colorless crystals, m.p.: 96° to 97°C.

2-Methoxy-4,6-dichloro-trimesic aldehyde (4)

A mixture of 300 ml of glacial acetic acid, 30 ml of 20 percent sulfuric acid and 162 g (0.4 mol) of 2-methoxy-4,6-dichloro-trimesic aldehyde hexamethyl acetal is boiled under reflux for 4 hours, a solution being obtained. When this is cold, a crystal paste is again formed. This is diluted with 500 ml of water, filtered with suction and recrystallized from acetone.
Yield: 83 g = 79.5 percent of the theory, colorless crystals, m.p.: 124°C.

2-Hydroxy-4,6-dichloro-trimesic aldehyde (6)

A mixture of 1,000 ml of acetone, 150 g of sodium iodide and 130.5 g (0.5 mol) of 2-methoxy-4,6-dichloro-trimesic aldehyde is boiled under reflux for 2 hours and filtered with suction when cold. The crystal paste is boiled under reflux with 1,000 ml of 10 percent sulfuric acid for 15 minutes, filtered with suction, washed with water and dried.
Yield: 118 g = 95 percent of the theory, of beige colored crystals, m.p.: 134°C.

2-Hydroxy-4,6-dimethoxy-trimesic aldehyde (7)

78 g (0.3 mol) of 2-methoxy-4,6-dichloro-trimesic aldehyde are added portionwise to a solution of 36 g (0.9 mol) of sodium hydroxide in 400 ml of methanol at 0 to 5°C. The mixture is boiled under reflux for 4 hours and filtered with suction when cold. The crystal paste is stirred up with 400 ml of 10 percent sulfuric acid for 30 minutes, filtered with suction, washed with water and dried.
Yield: 57 g = 80 percent of the theory, colorless crystals, m.p.: 137°C.

2,4-Dihydroxy-6-methoxy-trimesic aldehyde (8)

A mixture of 1,000 ml of acetone, 75 g (0.5 mol) of sodium iodide and 119 g (0.5 mol) of 2-hydroxy-4,6-dimethoxy-trimesic aldehyde are boiled under reflux for 4 hours under nitrogen. 1,000 ml of 5 percent sulfuric acid is added to the resulting suspension which is then stirred for 30 minutes, suction filtered, washed with water, dried and recrystallized from benzene.
Yield: 79 g = 70.5 percent of the theory, m.p.: 144°C.

2,4,6-Trihydroxy-trimesic aldehyde (9)

190 g (0.8 mol) of 2-hydroxy-4,6-dimethoxy-trimesic aldehyde are boiled under reflux with a solution of 375 g (2.5 mol) of sodium iodide in 4,000 ml of acetone for 24 hours. The resulting crystal paste is suction filtered, stirred up with 3,000 ml of 10 percent sulfuric acid, filtered under suction, washed with water and recrystallized from dioxane.
Yield: 147 g = 87 percent of the theory, m.p.: 199° to 200°C.

The corresponding acetals and sodium bisulfite addition products can be easily prepared from the aldehydes described above in known manner.

The compounds according to the invention are excellent hardeners for gelatin layers and in particular for photographic gelatin layers and especially those which have a latent effect, i.e., hardeners which manifest their effect only under certain external conditions, in this case under a change in pH. In the fresh gelatin layers prepared with the use of compounds according to the invention, the hardening reaction therefore for the most part does not set in immediately. The layers do not show an increase in melting point after drying. Even after 1 to 2 days' storage under conditions simulating a longer storage time, e.g., at 57°C and 34 percent relative humidity, only a small amount of crosslinking is generally observed. Under the effect of an alkaline bath, on the other hand, the latent hardeners develop their full activity and hardening rapidly reaches its maximum value.

Photographic layers are understood in this context to mean generally layers which are used for photographic materials, e.g., light-sensitive silver halide emulsion layers, protective layers, filter layers, antihalation layers, backing layers or quite generally photographic auxiliary layers. The effect of the compounds for use according to the invention is not impaired by the usual photographic additives. Similarly, the hardeners according to the invention are inert to photographically active substances such as stabilizers, sensitizers and the like. They exert no influence on the light-sensitive silver halide emulsions.

The compounds according to the invention are generally added in dissolved form to the casting solutions for the gelatine layers. Suitable solvents for this purpose are water or other low boiling solvents such as methanol, ethanol, acetone, chloroform, nitromethane or ethyl acetate. The concentration of the hardeners according to the invention may vary within wide limits. It depends on the effectiveness of the hardener used and the required degree of hardness. Concentrations of between 0.2 and 5 percent by weight of hardener, based on the dry weight of gelatin, have generally been found to be satisfactory.

The hardeners according to the invention may also be used in combination with known hardeners such as formalin, N,N', N''-tris-acryloylhexahydro-1,3,5-triazine, divinylsulfone, mucochloric acid or mucobromic acid.

The crosslinking of gelatin obtained with the hardeners according to the invention is assessed by determining the melting point of the cast layers as follows:

The strips of paper on which gelatin has been cast are half dipped into cold water, the temperature of which is continuously raised by 5°C per minute. The temperature at which the layer runs off the supports with formation of streaks is defined as the melting point. The swelling is determined gravimetrically after 10 minutes' treatment in distilled water at 22°C and is indicated in percent.

The wet strength is determined by passing a metal tip of specified size over the wet layer and loading it with an increasing weight. The wet strength is defined as the weight at which the tip leaves a visible scratch on the layer. A heavy weight corresponds to a high wet strength.

EXAMPLE 1

200 ml of a silver halide emulsion which contains 5 percent of gelatin is adjusted to pH 6.2 and the hardener which is dissolved in ethyl acetate or water is emulsified in the silver halide emulsion, using a mixing apparatus. The resulting mixture is cast on a triacetyl cellulose support which has been treated with a bonding layer. The melting points of the layers and other properties are determined after the following preliminary treatments:

Condition 1:
  48 hours' storage of the layers at room temperature (22°C)
Condition 2:
  36 hours' storage of the layers at 57°C and 35 percent relative humidity
Condition 3:
  storage as under 1 followed by 1 minute's treatment with a 3 percent aqueous potassium carbonate solution.

One, 2 and 5 percent of hardener, based on the dry weight of gelatin, are added to each of the casting solutions.

The results are summarized in Table 1.

TABLE 1

| | Amount added in percent (based on gelatin) | Melting points of the layer in °C after storage under | | | Swelling in percent (condition 3) | Wet strength (condition 3) |
|---|---|---|---|---|---|---|
| | | Condition 1 | Condition 2 | Condition 3 | | |
| Compound 1... | 1 | 35 | 41 | 88 | | |
| | 2 | 35 | 41 | 100 | 310 | 500 p |
| | 5 | 35 | 41 | 100 | 270 | 700 p |
| Compound 2... | 1 | 36 | 36 | 80 | | |
| | 2 | 36 | 36 | 90 | | |
| | 5 | 36 | 36 | 100 | | |
| Compound 4... | 1 | 35 | 45 | 63 | | |
| | 2 | 35 | 46 | 76 | | |
| | 5 | 35 | 46 | 98 | 270 | 1200 p |

The table shows that after storage under conditions 1 and 2 the hardeners undergo little or no crosslinking. Only after treatment with an alkaline bath are melting points close to or above 100°C obtained. The photographic properties of the silver halide emulsion are not impaired.

EXAMPLE 2

120 ml of an 8 percent aqueous solution of the sodium salt of a coupler of the following formula:

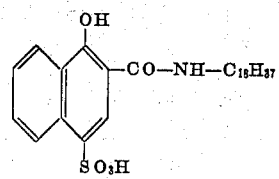

are added to 400 ml of a silver chlorobromide emulsion which contains 32 g of gelatin.

After the addition of 5 ml of a 1 percent methanolic solution of 4-hydroxy-6-methyl-1,3,3a,7-tetraazaindene and 6 ml of a 10 percent aqueous saponin solution, 250 ml of water are added, the pH is adjusted to 6.2 and 32 ml of a 2 percent acetone solution of compound 4 are added to the resulting solution. The layers are dried at room temperature. After the various pretreatments, the following melting points are obtained:
Condition 1: 45°C
Condition 2: 50°C.

After processing following storage under Condition 2, i.e., after the use of a developer bath, a fixing bath, the bleaching bath and washing: 100°C; the wet strength was 200 p.

The photographic properties of the layer remained unchanged. After chromogenic processing, a cyan dye image is obtained.

EXAMPLE 3

Two percent of hardener dissolved in ethyl acetate and 0.3 percent of hardener dissolved in ethyl acetate are, respectively, emulsified at pH 6.2 in 1 litre of a 5 percent gelatin solution containing 0.5 percent, based on gelatin, of tartrazine as dye, the emulsification being carried out by means of a mixing apparatus. The usual casting additives are then added to the casting solutions and the mixture is cast on a prepared cellulose acetate support. Layers about 3 $\mu$ in thickness were prepared.

The results obtained after various pretreatments (see Example 1) are shown in Table 2.

TABLE 2

| Additive | Melting point of layer in ° C | | | Swelling in percent (condition 3) | wet strength (condition 3) |
|---|---|---|---|---|---|
| | Condition 1 | Condition 2 | Condition 3 | | |
| None | 35 | 35 | 35 | 700 | 100 p |
| 2 percent Compound 1 | 35 | 41 | 100 | 310 | 700 p |
| 2 percent Compound 4 | 35 | 46 | 80 | ....... | ....... |
| 0.3 percent Compound 6 | 73 | 86 | 100 | 290 | 500 p |
| 0.3 percent Compound 7 | 75 | 100 | 100 | 425 | 700 p |

It will be seen from the table that the aromatic trialdehydes according to the invention are extraordinarily effective. A high melting point is reached even when only very small quantities are added (compounds 6 and 7). In the case of these compounds, the latent effect is reduced correspondingly and the quantity of hardener must be reduced. There is, therefore, a transition between the class of latent hardeners and simple hardeners.

We claim:

1. A light sensitive photographic material comprising a support having thereon gelatin having as an essential ingredient a trimesic aldehyde which is substituted in the 2-, 4-, and 6-positions with chlorine, hydroxy or methoxy, or the hexamethyl acetal or bisulfite addition product of such aldehyde, the proportion of such aldehyde being such as to cause hardening of the gelatin when the gelatin is rendered alkaline, and at least one gelatino-silver halide emulsion layer.

2. A photographic material as claimed in claim 1, wherein the gelatin containing the trimesic aldehyde is included in a layer other than the gelatino-silver halide emulsion layer.

3. In a process for providing gelatin in a photographic material by casting a gelatino-silver halide emulsion on a support, or by casting a gelatin layer on a support with a light sensitive element comprised of gelatino-silver halide emulsion and drying the cast materials on the support, the improvement which consists of incorporating in gelatin for casting on the support a hardening amount of a trimesic aldehyde which is substituted with chlorine, hydroxy, or methoxy in the 2-, 4- and 6-positions, or the hexamethyl acetal or bisulfite addition product of such aldehyde, and subsequent to the casting and drying, treating gelatin containing the trimesic aldehyde on the supported casting in an alkaline solution to increase the pH thereof.

* * * * *